US006021800A

United States Patent [19]

Schild et al.

[11] Patent Number: 6,021,800

[45] Date of Patent: Feb. 8, 2000

[54] PRESSURE CONTROL SYSTEM

[75] Inventors: Rolf Schild, London; Jarred Evans, Bridgend, both of United Kingdom

[73] Assignee: Huntleigh Technology, PLC, Bedfordshire, United Kingdom

[21] Appl. No.: 09/091,603

[22] PCT Filed: Oct. 16, 1997

[86] PCT No.: PCT/GB97/02848

§ 371 Date: Sep. 11, 1998

§ 102(e) Date: Sep. 11, 1998

[87] PCT Pub. No.: WO98/17154

PCT Pub. Date: Apr. 30, 1998

[30] Foreign Application Priority Data

Oct. 17, 1996 [GB] United Kingdom .................. 9621674

[51] Int. Cl.[7] .................................................. F16K 17/00

[52] U.S. Cl. ................................. 137/115.24; 137/115.27

[58] Field of Search .......................... 137/115.13, 115.24, 137/115.27

[56] References Cited

U.S. PATENT DOCUMENTS

| | | | |
|---|---|---|---|
| 2,436,242 | 2/1948 | Aspelin | 137/115.13 X |
| 3,482,405 | 12/1969 | Sansevero | 137/115.13 X |
| 4,787,413 | 11/1988 | Saggers | 137/494 |
| 4,971,527 | 11/1990 | Dick | 137/115.27 X |
| 5,649,561 | 7/1997 | Brandt | 137/115.13 |
| 5,842,455 | 12/1998 | Tuckey et al. | 137/115.27 X |

*Primary Examiner*—Stephen M. Hepperle
*Attorney, Agent, or Firm*—Brown Raysman Millstein Felder & Steiner LLP

[57] ABSTRACT

A pressure control system controls pressure in a fluid system, and includes a compressor for producing pressurized fluid, with the compressor coupled to a rotor valve and pressure controller. A manifold supports at least the valve and pressure controller, and the manifold has integral passages within establishing a connection for fluids from the compressor to the valve and pressure controller for controlling the fluid pressure to the system.

22 Claims, 4 Drawing Sheets

PRESSURE CONTROL SYSTEM

BACKGROUND OF THE INVENTION

1. Field of the Invention

The present invention relates to a pressure control system for use, for example in controlling fluid pressure in the pressure pads of an alternating pressure mattress of a medical bed.

2. Discussion of Related Art

A known pressure control system for an alternating pressure mattress is shown in FIG. 1. The mattress is part of a medical bed and includes two series of inflatable cells which are interleaved, one series within the other. The cells are alternately inflatable to support a patient at different locations to prevent the formation of decubitus ulcers, known as bed sores. Typically, inflation and deflation cycles may last from under two minutes to over twenty minutes.

The pressure control system includes a compressor 10 for producing pressurised fluid, typically air, which is coupled to a rotor valve 12 via a conduit 14. The rotor valve 12 couples the air either to one of or to both of first and second supply conduits 16, 18. Each supply conduit 16, 18 is coupled to a respective series of inflatable cells 20, 22. These cells 20, 22 are interleaved such that a cell from one series is located between two cells of the other series.

Extending from the conduit 14 is a discharge conduit 24 which can be closed by a pivotable valve plate 26. This valve plate 26 acts against a load, in the form of a user adjustable coil spring 28. A pair of bellows 30, 32 is located to act against the valve plate 26. The first bellows 30 is coupled by tubing to the first supply conduit 16, while the second bellows 32 is coupled by tubing to the second supply conduit 18. Thus, the amount of air in each bellows 30, 32, and thus the shape thereof, is dependent upon the air pressure in the first and second supply conduits 16, 18.

Located at the opposite side of the bellows 30, 32 is a support plate 34 which is able to move in a direction towards the bellows 30, 32 when the pressure exerted by microswitch 36 exceeds the counter pressure produced by the bellows 30, 32. Thus, the movement of the support plate 34 and microswitch 36 act as a low pressure warning, for which a low pressure indicating lamp 38 is provided, coupled to the low pressure switch.

The bellows 30, 32 act together to control the overall pressure in the cells 20, 22. More specifically, as long as the combined fluid pressure in the cells 20, 22 is less than a predetermined threshold, the equivalent pressure in the bellows 30, 32 is insufficient to overcome the resisting force of coil spring 28. However, when the combined pressure is above the threshold, the bellows 30, 32 move the valve plate 26 off the aperture of the discharge conduit 24, thereby allowing discharge of fluid and a reduction in the mattress pressure until the valve plate 26 moves back into abutment with the discharge conduit aperture.

This pressure control system has been successful in use. However, the double bellows 30, 32 can sometimes fail to operate satisfactorily and the tubing provided in the system can lead to failure due to fluid leaks which may be inherent or caused by damage in use.

SUMMARY OF THE INVENTION

The present invention seeks to provide an improved pressure control system.

According to an aspect of the present invention, there is provided a pressure control system for controlling the pressure in at least a first and a second fluid system, comprising an input conduit for receiving fluid from a fluid source, at least a first and a second supply conduit for supplying fluid to the first and second fluid systems, fluid directing means for directing fluid from the input conduit to one or both of the first and second supply conduits, and pressure control means including a single bellows coupled to the input conduit for controlling fluid pressure in the first and second fluid systems.

The location of the pressure control means at the input conduit reduces its complexity with respect to the prior art systems in which the pressure control means is coupled to the first and second supply conduits. Also, with one of the bellows used in the prior art system omitted, the system is thereby further simplified.

In the preferred embodiment, the pressure control system includes a discharge conduit able to discharge fluid from the input conduit, the first supply conduit and/or the second supply conduit; and valve means operable to open or close the discharge conduit in dependence upon the fluid pressure in the bellows. The discharge conduit is preferably coupled to the input conduit.

According to another aspect of the present invention, there is provided a pressure control system for controlling the pressure in at least one fluid system, comprising an input conduit for receiving fluid from a fluid source, a fluid supply conduit for supplying fluid to fluid system, and fluid directing means for directing fluid from the input conduit to the fluid supply conduit, and a pressure control housing including a manifold with passages located therein which provide the input conduit and the fluid supply conduit.

Preferably, the manifold includes connecting means for connecting directly thereto a fluid source. The manifold may also include a pressure controller connector for connecting directly thereto pressure control means coupled to the input conduit for controlling fluid pressure in the fluid system.

The manifold advantageously provides at least one substantially flat surface to which a fluid source of a pressure controller and/or any other peripheral item can be attached.

Thus, by use of such a manifold, the amount of tubing can be substantially reduced, thereby reducing the risks of malfunctions. Moreover, the manifold can provide support for auxiliary items.

Preferably, the manifold is formed from two plate-like parts at least one of which includes on an internal surface thereof recesses which provide the conduits.

In the preferred embodiment, one of the parts includes a plurality of recesses in its internal surface and the other part includes protrusions designed to coact with the recesses so as to locate the two parts relative to one another. The protrusions are preferably ribs which also act to provide a fluid tight seal for the conduits formed by the parts.

According to another aspect of the present invention, there is provided a pressure control system for controlling the pressure in first and second fluid systems, comprising an input conduit for receiving fluid from a fluid source, at least one fluid supply conduit for supplying fluid to a fluid system, and pressure control means coupled to the input conduit for controlling fluid pressure in the fluid system, the pressure control means including a fluid pressure indicator, a valve coupled to a fluid discharge port and operable by the fluid pressure indicator and a leaf spring coupled to the valve for providing a biasing force against which the fluid pressure indicator must act, the leaf spring being adjustable to adjust the biasing force.

BRIEF DESCRIPTION OF THE DRAWING

An embodiment of the present invention is described below, by way of example only, with reference to the accompanying drawings, in which.

DETAILED DESCRIPTION OF THE PREFERRED EMBODIMENTS

Figure 1:
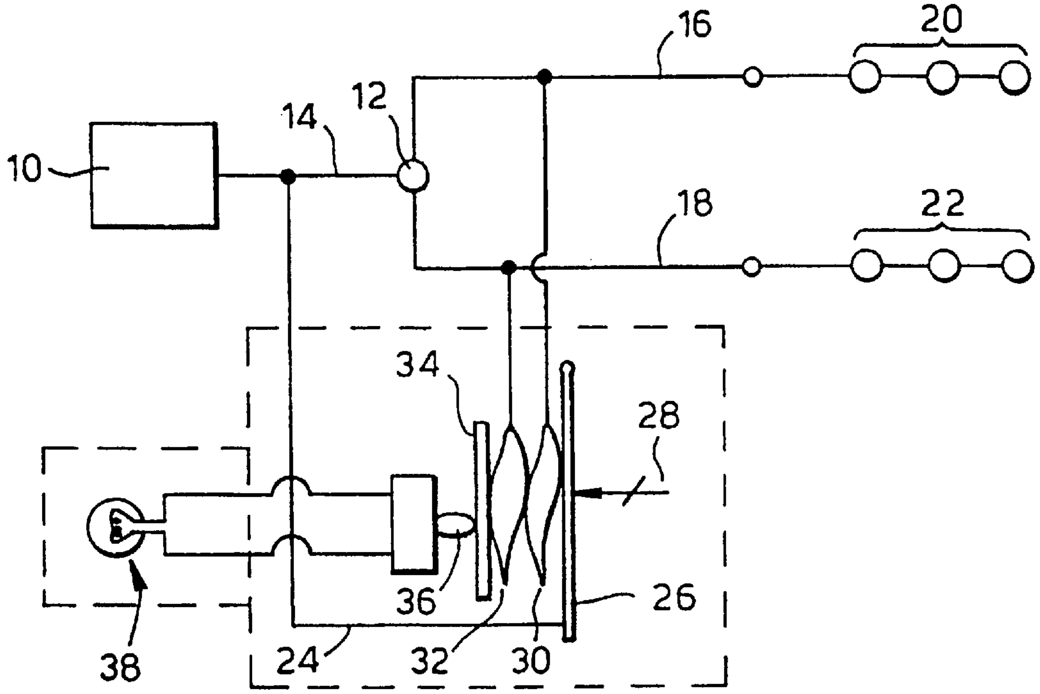
FIG. 1 (Prior Art)
FIG. 1 is a schematic diagram of a prior art pressure control system.
Figure 2:
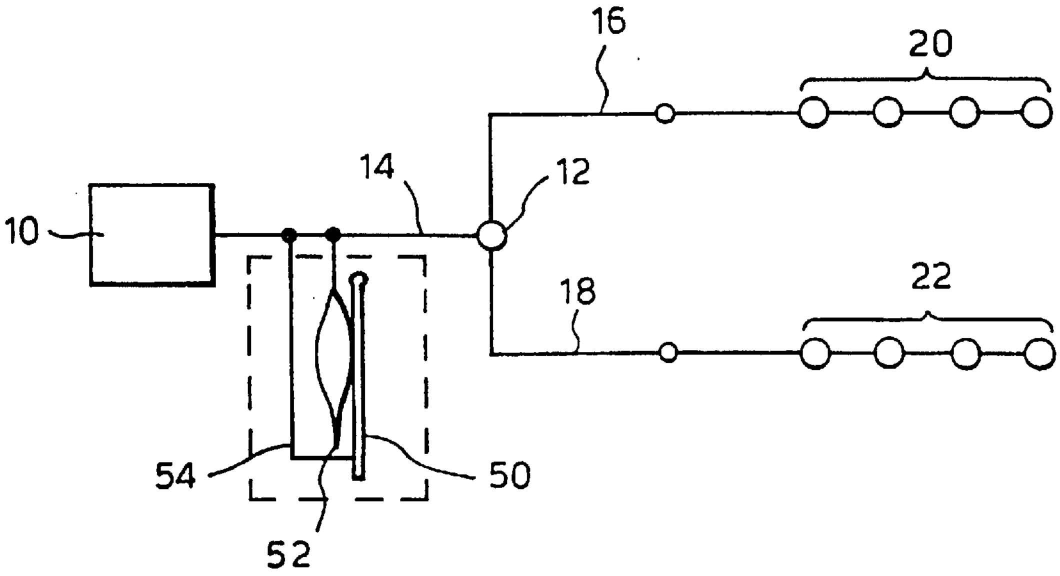
FIG. 2 is a schematic diagram of an embodiment of pressure control system.

Referring to FIG. 2, the preferred embodiment of pressure control system includes an input conduit 14 coupled to a compressor 10 for producing pressurised fluid, typically air. A rotor valve 12 is coupled to the input conduit 14 and couples the fluid to either one or both of first and second supply conduits 16, 18. Each supply conduit 16, 18 is coupled to a respective series of inflatable cells 20, 22 which interleaved such that a cell from one series is located between two cells of the other series. This part of the pressure control system is similar to that of the prior art.

Extending from the conduit 14 is a discharge conduit 54 which can be closed by a pivotable valve plate 50. A single bellows 52 is located to act against the valve plate 50 and is coupled by a suitable conduit to the input conduit 14.

Figure 7:
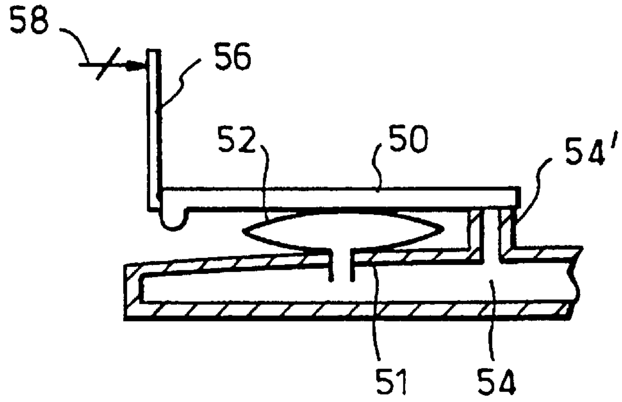
FIG. 7 is a cross-sectional view of a pressure bleed member of the pressure control system of FIG. 2.

Referring also to FIG. 7, the valve plate 50 has integrally formed therewith a leaf spring 56, the tension of which is user adjustable by a suitable adjustment 58. The leaf spring 56 produces a force which biases the valve plate 50 against the opening of the discharge conduit 54.

The amount of air in the bellows 52 and thus the shape thereof is dependent upon the air pressure in the input conduit 14, which is typically representative of the pressure in one or both of the cell groups 20, 22. When this pressure is greater than the biasing pressure of the leaf spring 56, the bellows 52 causes the flap to pivot away from the opening of the conduit 54, thereby to allow fluid to escape from the input conduit 14 and to reduce the pressure in one or both of the cell groups 20, 22.

It has been found that the leaf spring 56 provides increased tolerance and consistency over the prior art coil springs.

Not visible in FIG. 2 is the support at the other side of the bellows 52, equivalent to the support 34 of the prior art system. The nature of the support will become apparent from the ensuing description.

It can be seen from the embodiment of FIG. 2 that the pressure control system is significantly simpler than the prior art system. Moreover, since only one bellows is used, problems of bellows movement and relative states is avoided. With the single bellows, it is possible to measure the pressure in just one of the cell groups 20, 22 completely independently of the pressure in the other group, or indeed one can measure the combined pressures (if the valve 12 is moved to a position in which both supply conduits 16, 18 are coupled to the input conduit 14).

Figure 3:
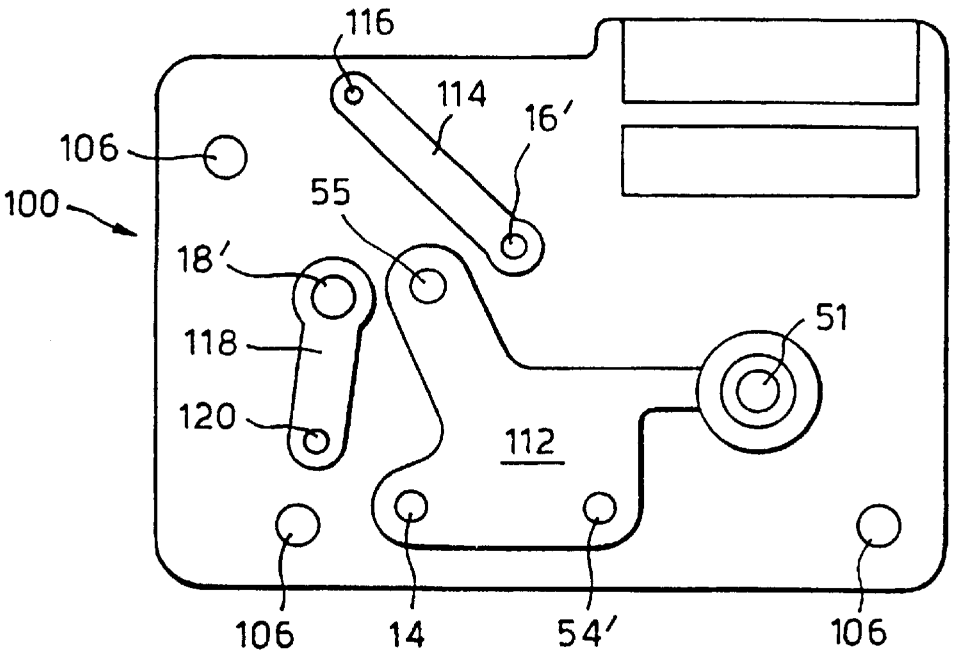
FIG. 3 is a plan view of the internal surface of a first part of a manifold of the pressure control system of FIG. 2.
Figure 4:
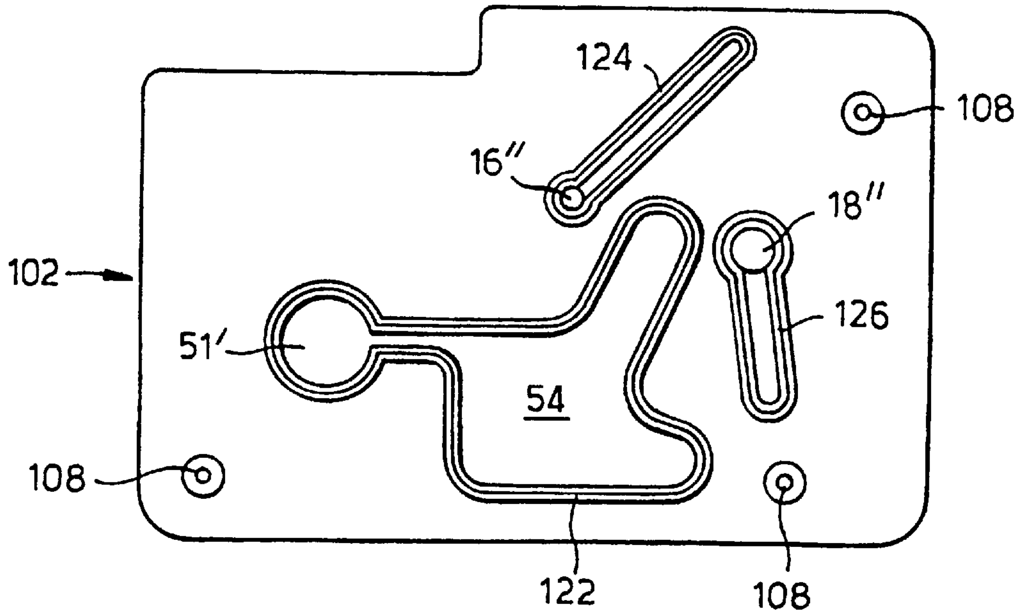
FIG. 4 is a plan view of the internal surface of a second part of a manifold of the pressure control system of FIG. 2.
Figure 5:
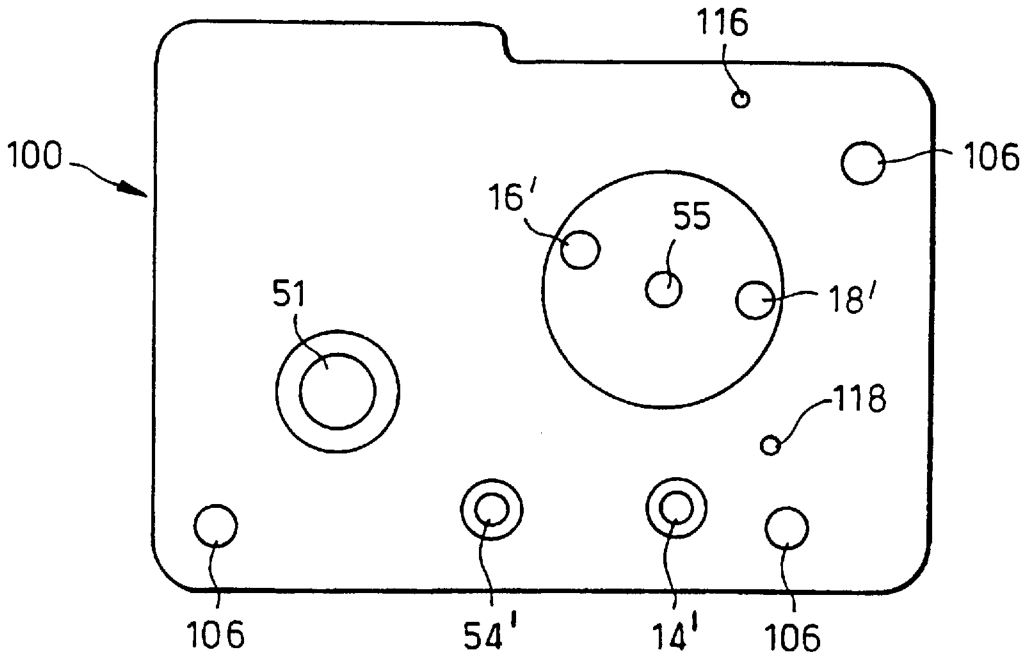
FIG. 5 is a plan view of the external surface of the first part of the manifold of FIG. 3.
Figure 6:
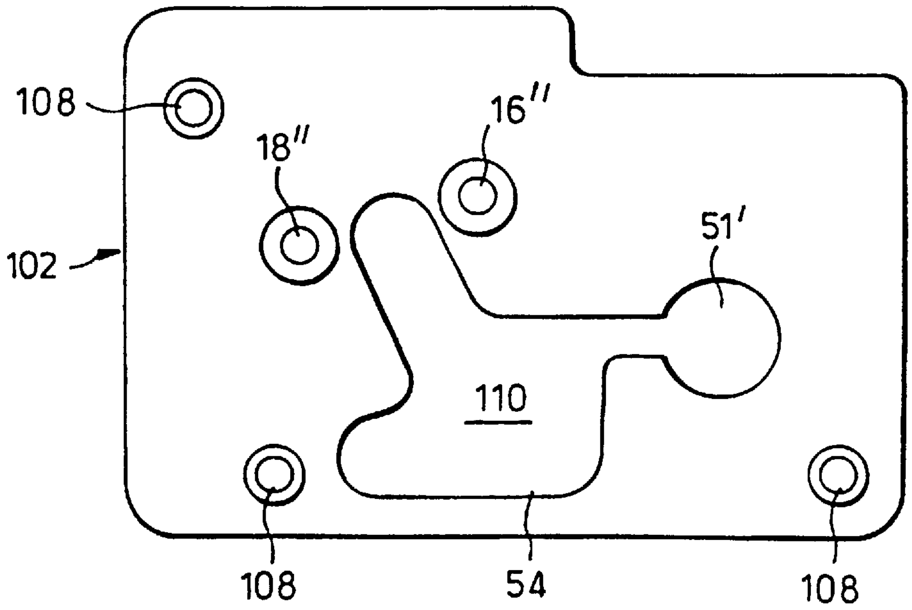
FIG. 6 is a plan view of the external surface of the second part of the manifold of FIG. 4.

The conduits 14, 16 and 18 and part of the rotary valve 12 are formed within a manifold which is shown in FIGS. 3 to 6. Referring first to FIGS. 5 and 6, the manifold is formed from two plates 100, 102. The outer side of first plate 100 (shown in FIG. 5) includes a mounting area 104 onto which a rotary valve (not shown) is mounted. At the mounting area 104, there are provided ports 16', 18' which feed to the supply conduits 16, 18. These ports 16', 18' can be coupled through the rotary valve 12 to a central port 55 which is in fluid communication with a port 14' connected to the input conduit 14.

The port 54' of the discharge conduit 54 is also disposed at the outer side of the first plate 100 and is close to a port 51 which couples the input conduit 14 to the bellows 52, as is described in further detail below.

Fixing locations 106 are also provided on the first manifold plate 106, corresponding with equivalent fixing locations 108 on the second manifold plate 102, and enable the manifold to be secured within a casing or the like.

The second manifold plate 102 has output ports 16", 18" which couple to the supply conduits 16, 18. A protrusion 110 provides the discharge conduit 54 between the two plates 100, 102, as will become more apparent below. An enlarged region 51' of this protrusion provides fluid and hence pressure coupling to port 51 to enable inflation and deflation of the bellows 52.

FIG. 7 shows a schematic view of a cross-section of the manifold at the location of the bellows 52. As can be seen, the bellows 52 includes an input port which fits within the port 51 which thus couples the bellows 52 to the discharge conduit 54. The discharge port 54' is closed by the pivotable valve plate 50 described above. It will be apparent that the manifold itself provides the support against which the bellows 52 can press in order to urge the valve plate 50 off the discharge port 54' when the pressure in the discharge manifold 54 exceeds the preset pressure.

Reference is now made to FIGS. 3 and 4, which show respectively the inner sides of the first and second manifold plates 100, 102. The first manifold plate 100 is provided with a plurality of recesses which cooperate with projections on the second manifold plate 102 to form the various conduits. The first recess 112 extends to the central aperture 55 at the rotary valve, to the port 14' for the input conduit 14, to the output port 54' of the discharge conduit 54 and to the port 51 which feeds the bellows 52. Thus, this recess 112 provides part of the discharge conduit 54.

Recess 114 covers port 16' coupled to the rotary valve. Moreover, this recess 114 also extends to a small, optional bleed port 116 in cases where such a bleed is desirable.

A similar recess 118 covers port 18' and also extends to a small, optional bleed port 120.

The inner side of second manifold plate 102 includes a plurality of protrusions or walls 122, 124, 126 which have shapes corresponding to the shapes of the recesses in the first manifold plate 100. Each wall 122, 124, 126 includes a narrow rib at the top of the wall which is melted during assembly to fix the first and second manifold plates 100, 102 to one another to form fluid tight conduits in the manifold.

When the two manifold plates 100, 102 are secured together, the various conduits of the system, at the region of the control elements, are formed. The manifold plates may not have the ribs and protrusions but simply channels formed therein which are matched and the manifold plates secured together by adhesive.

It will be apparent from FIGS. 3 and 4 that the output ports 16" and 18" can only be coupled to the input conduit 14 via the rotary valve, thereby providing the fluid pressure control sought. The rotary valve is preferably of the type which allows varying proportions of fluid to be coupled to its output ports as desired.

In the preferred embodiment, the rotary valve assembly, which is of conventional design, is built onto the manifold. Once a simple gasket is placed in the mounting area 104, a flat disc of plastics material is located over the gasket. The disc has holes corresponding to the ports 16', 18' and 55. This disc is held stationary while a second disc is placed over the first disc and is able to rotate. In this way, air from the manifold is fed into the valve and directed in various proportions back to the other ports in the manifold where it is fed to the output ports 16", 18". A motor assembled to the manifold provides the rotational drive to the valve and by compressing a coil spring it ensures that force is applied between the rotating and stationary discs to prevent leakage.

Figure 8:
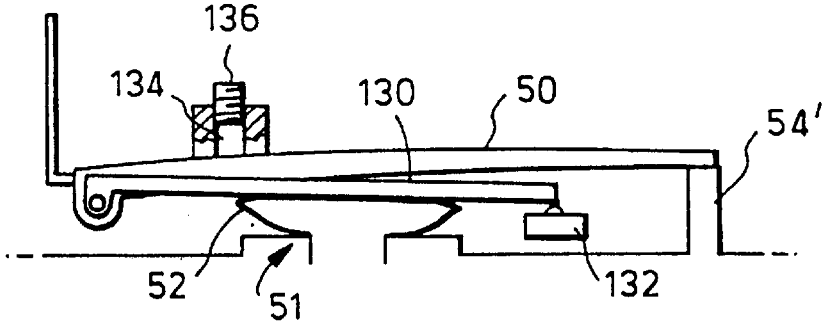
FIG. 8 is a cross-sectional view of an embodiment of low pressure indicating system for the pressure control system of FIG. 2.

FIG. 8 shows an optional low pressure indicator. This includes a pivotable bar 130 which rests on the bellows 52 and which is able to trigger a microswitch 132. Biasing the bar 130 towards the microswitch 132 is a spring 134 which can be adjusted by a screw adjustment 136. When the fluid pressure in the bellows 52 is less than the preset force of the spring 134, the bar 130 depresses the microswitch 132 to indicate a low pressure condition. The microswitch 132 will trigger a suitable visual and/or audio indicator.

It will be apparent from the above that cue manifold avoids much of the tubing associated with prior art systems. Moreover, it provides a support onto which other components of the system can be secured.

Figure 9:
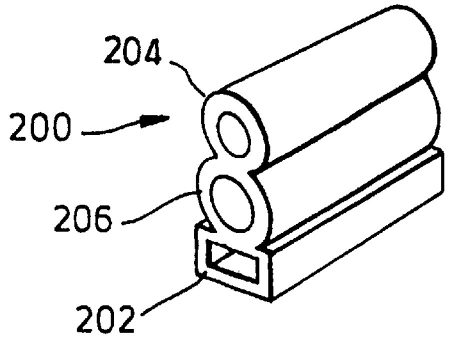
FIG. 9 is a cross-sectional view of a vibration damping mount for a fluid pump.

Referring to FIG. 9, there is shown a vibration damping mount 200 for use with the pressure control system described above. The mount 200 is formed of three tubular portions. The first portion 202, which in this embodiment has a rectangular cross-section, is designed to couple to a securing post of a device casing. The second portion 204, which in this embodiment has a circular cross-section, is designed to couple to a securing post of the vibrating apparatus, in this example the compressor 10. Coupling the first and second portions together is a tubular vibration damping member 206, which in this embodiment has a circular cross-section. In an alternative embodiment, the vibration damping member is a simple strip of material.

The vibration damping mount 200 is preferably formed of an elastomeric material such as rubber. It is preferably formed by extrusion, which is not only relatively cheap but also enables any desired length of mount to be cut. Different lengths of mount 200 will provide differing levels of vibration damping.

What is claimed is:

1. A pressure control system for controlling the pressure in at least a first and a second fluid system, comprising an input conduit for receiving fluid from a fluid source, at least a first and a second supply conduit for supplying fluid to the first and second fluid systems, fluid directing means for directing fluid from the input conduit to one or both of the first and second supply conduits, and pressure control means including a single bellows supported by and pressing against a manifold to control the flow of fluid, with the bellows coupled to the input conduit for controlling fluid pressure in and between the first and second fluid systems.

2. A pressure control system according to claim 1, including a discharge conduit able to discharge fluid from one or more of the input conduit, the first supply conduit and the second supply conduit; and valve means operable to open or close the discharge conduit in dependence upon the fluid pressure in the bellows.

3. A pressure control system according to claim 2, wherein the discharge conduit is coupled to the input conduit.

4. A pressure control system for controlling the pressure in at least one fluid system, comprising an input conduit for receiving fluid from a fluid source, a fluid supply conduit for supplying fluid to the at least one fluid system, fluid directing means for directing fluid from the input conduit to the fluid supply conduit, and a pressure control housing including a manifold with passages located therein which provide the input conduit and the fluid supply conduit, and including bellows supported by and pressing against the manifold for controlling the pressure of the fluid within the at least one fluid system.

5. A pressure control system according to claim 4, wherein the manifold includes connecting means for connecting directly thereto a fluid source.

6. A pressure control system according to claim 4, wherein the manifold includes a pressure controller connector for connecting directly thereto pressure control means coupled to the input conduit for controlling fluid pressure in the fluid system.

7. A pressure control system according to claim 4, wherein the manifold provides at least one substantially flat surface to which can be attached one or more of a fluid source a pressure controller and any other peripheral item.

8. A pressure control system according to claim 5 wherein the manifold includes a pressure controller connector for connecting directly thereto the pressure control means coupled to the input conduit for controlling fluid pressure in the fluid system.

9. A pressure control system according to claim 6, wherein the manifold provides at least one substantially flat surface to which can be attached one or more of a fluid source, a pressure controller and any other peripheral items.

10. A pressure control system for controlling the pressure in at least one fluid system, comprising:

an input conduit for receiving fluid from a fluid source;

a fluid supply conduit for supplying fluid to the at least one fluid system;

fluid directing means for directing fluid from the input conduit to the fluid supply conduit; and a pressure control housing including a manifold with passages located therein which provide the input conduit and the fluid supply conduit;

wherein the manifold is formed from two plate-like parts at least one of which includes on an internal surface thereof recesses, the parts being coupled together so as to provide the conduits.

11. A pressure control system for controlling the pressure in first and second fluid systems, comprising an input conduit for receiving fluid from a fluid source, at least one fluid supply conduit for supplying fluid to a fluid system, and pressure control means coupled to the input conduit for controlling fluid pressure in the fluid system, the pressure control means including a fluid pressure indicator, a valve coupled to a fluid discharge port and operable by the fluid pressure indicator and a leaf spring coupled to the valve for providing a biasing force against which the fluid pressure indicator must act, the leaf spring being adjustable to adjust the biasing force.

12. A pressure control system for controlling the pressure in at least one fluid system, comprising:

an input conduit for receiving fluid from a fluid source;

a fluid supply conduit for supplying fluid to the at least one fluid system;

fluid directing means for directing fluid from the input conduit to the fluid supply conduit; and a pressure control housing including a manifold with passages located therein which provide the input conduit and the fluid supply conduit;

wherein the manifold includes connecting means for connecting directly thereto a fluid source;

wherein the manifold includes a pressure controller connector for connecting directly thereto pressure control means coupled to the input conduit for controlling fluid pressure in the fluid system; and wherein the manifold provides at least one substantially flat surface to which can be attached one or more of a fluid source, a pressure controller and any other peripheral items.

13. A pressure control system for controlling the pressure in at least one fluid system, comprising:

an input conduit for receiving fluid from a fluid source;

a fluid supply conduit for supplying fluid to the at least one fluid system;

fluid directing means for directing fluid from the input conduit to the fluid supply conduit; and a pressure control housing including a manifold with passages located therein which provide the input conduit and the fluid supply conduit;

wherein the manifold includes connecting means for connecting directly thereto a fluid source;

wherein the manifold includes a pressure controller connector for connecting directly thereto pressure control means coupled to the input conduit for controlling fluid pressure in the fluid system; and wherein the manifold provides at least one substantially flat surface to which can be attached one or more of a fluid sources a pressure controller and any other peripheral items; and wherein the manifold is formed from two plate-like parts at least one of which includes on an internal surface thereof recesses, the parts being coupled together so as to provide the conduits.

14. A pressure control system for controlling the pressure in at least one fluid system, comprising:

an input conduit for receiving fluid from a fluid source;

a fluid supply conduit for supplying fluid to the at least one fluid system;

fluid directing means for directing fluid from the input conduit to the fluid supply conduit; and a pressure control housing including a manifold with passages located therein which provide the input conduit and the fluid supply conduit;

wherein the manifold includes connecting means for connecting directly thereto a fluid source;

wherein the manifold includes a pressure controller connector for connecting directly thereto pressure control means coupled to the input conduit for controlling fluid pressure in the fluid system; and wherein the manifold is formed from two plate-like parts at least one of which includes on an internal surface thereof recesses, the parts being coupled together so as to provide the conduits.

15. A pressure control system for controlling the pressure in at least one fluid system comprising:

an input conduit for receiving fluid from a fluid source;

a fluid supply conduit for supplying fluid to the at least one fluid system;

fluid directing means for directing fluid from the input conduit to the fluid supply conduit; and a pressure control housing including a manifold with passages located therein which provide the input conduit and the fluid supply conduit;

wherein the manifold includes connecting means for connecting directly thereto a fluid source; and wherein the manifold provides at least one substantially flat surface to which can be attached one or more of a fluid source, a pressure controller and any other peripheral items.

16. A pressure control system for controlling the pressure in at least one fluid system, comprising:

an input conduit for receiving fluid from a fluid source;

a fluid supply conduit for supplying fluid to the at least one fluid system;

fluid directing means for directing fluid from the input conduit to the fluid supply conduit; and a pressure control housing including a manifold with passages located therein which provide the input conduit and the fluid supply conduit;

wherein the manifold includes connecting means for connecting directly thereto a fluid source;

wherein the manifold provides at least one substantially flat surface to which can be attached one or more of a fluid source, a pressure controller and any other peripheral items; and wherein the manifold is formed from two plate-like parts at least one of which includes on an internal surface thereof recesses, the parts being coupled together so as to provide the conduits.

17. A pressure control system for controlling the pressure in at least one fluid system, comprising:

an input conduit for receiving fluid from a fluid source;

a fluid supply conduit for supplying fluid to the at least one fluid system;

fluid directing means for directing fluid from the input conduit to the fluid supply conduit; and a pressure control housing including a manifold with passages located therein which provide the input conduit and the fluid supply conduit;

wherein the manifold includes a pressure controller connector for connecting directly thereto pressure control means coupled to the input conduit for controlling fluid pressure in the fluid system;

wherein the manifold provides at least one substantially flat surface to which can be attached one or more of a fluid source, a pressure controller and any other peripheral items; and wherein the manifold is formed from two plate-like parts at least one of which includes on an internal surface thereof recesses, the parts being coupled together so as to provide the conduits.

18. A pressure control system for controlling the pressure in at least one fluid system, comprising:

an input conduit for receiving fluid from a fluid source;

a fluid supply conduit for supplying fluid to the at least one fluid system;

fluid directing means for directing fluid from the input conduit to the fluid supply conduit; and a pressure control housing including a manifold with passages located therein which provide the input conduit and the fluid supply conduit;

wherein the manifold includes connecting means for connecting directly thereto a fluid source; and wherein the manifold is formed from two plate-like parts at least one of which includes on an internal surface thereof recesses, the parts being coupled together so as to provide the conduits.

19. A pressure control system for controlling the pressure in at least one fluid system, comprising:

an input conduit for receiving fluid from a fluid source;

a fluid supply conduit for supplying fluid to the at least one fluid system;

fluid directing means for directing fluid from the input conduit to the fluid supply conduit; and a pressure control housing including a manifold with passages located therein which provide the input conduit and the fluid supply conduit;

wherein the manifold includes a pressure controller connector for connecting directly thereto pressure control means coupled to the input conduit for controlling fluid pressure in the fluid system; and wherein the manifold is formed from two plate-like parts at least one of which includes on an internal surface thereof recesses, the parts being coupled together so as to provide the conduits.

20. A pressure control system for controlling the pressure in at least one fluid system comprising;

an input conduit for receiving fluid from a fluid source;

a fluid supply conduit for supplying fluid to the at least one fluid system;

fluid directing means for directing fluid from the input conduit to the fluid supply conduit; and a pressure control housing including a manifold with passages located therein which provide the input conduit and the fluid supply conduit;

wherein the manifold provides at least one substantially flat surface to which can be attached one or more of a fluid source, a pressure controller and any other peripheral item; and wherein the manifold is formed from two plate-like parts at least one of which includes on an internal surface thereof recesses, the parts being coupled together so as to provide the conduits.

21. A pressure control system according to claim 20, wherein one of the parts includes a plurality of recesses in its internal surface and the other part includes protrusions designed to coact with the recesses so as to position the two parts relative to one another.

22. A pressure control system according to claim 21, wherein the protrusions are ribs which also act to provide a fluid tight seal for the conduits formed by the parts.

* * * * *